(12) United States Patent
Rao

(10) Patent No.: US 6,194,802 B1
(45) Date of Patent: Feb. 27, 2001

(54) AXIAL GAP MOTOR WITH RADIALLY MOVABLE MAGNETS TO INCREASE SPEED CAPABLITY

(76) Inventor: Dantam K. Rao, 2212 Lynnwood Dr., Schenectady, NY (US) 12309

( * ) Notice: Subject to any disclaimer, the term of this patent is extended or adjusted under 35 U.S.C. 154(b) by 0 days.

(21) Appl. No.: 09/390,209

(22) Filed: Sep. 8, 1999

(51) Int. Cl.⁷ ...................................... H02K 5/00
(52) U.S. Cl. .......................... 310/91; 310/191; 310/209; 310/268
(58) Field of Search ............... 310/91, 92, 103, 310/74, 191, 209, 268

(56) References Cited

U.S. PATENT DOCUMENTS

| | | | |
|---|---|---|---|
| 403,017 | * 5/1889 | Wheeler | 388/818 |
| 1,153,076 | 9/1915 | Heinze, Jr. | 310/191 |
| 2,719,331 | 10/1955 | Harris | 264/46.7 |
| 2,784,332 | 3/1957 | Kober | 310/191 |
| 2,824,275 | 2/1958 | Kober | 322/27 |
| 2,892,144 | 6/1959 | Kober | 322/27 |
| 3,250,976 | 5/1966 | McEntire | 318/831 |
| 3,587,015 | * 6/1971 | Mitchell | 335/227 |
| 3,681,632 | * 8/1972 | Sliger | 310/46 |
| 3,992,132 | * 11/1976 | Putt | 417/271 |
| 4,237,396 | * 12/1980 | Blenkinsop et al. | 310/154 |
| 4,546,293 | 10/1985 | Peterson et al. | 318/254 |
| 5,053,659 | 10/1991 | Parker | 310/68 E |
| 5,334,899 | * 8/1994 | Skybyk | 310/268 |
| 5,627,419 | 5/1997 | Miller | 310/74 |
| 5,677,605 | 10/1997 | Cambier et al. | 318/25 |
| 5,691,587 | * 11/1997 | Lamb | 310/103 |
| 5,739,664 | 4/1998 | Deng et al. | 318/808 |
| 5,782,134 | * 7/1998 | Booden | 74/84 R |

* cited by examiner

Primary Examiner—Nestor Ramirez
Assistant Examiner—Joseph Waks
(74) Attorney, Agent, or Firm—Clyde I. Coughenour

(57) ABSTRACT

A brushless motor with axial air gaps is rotated at speeds higher than that of conventional motors by using magnets adjustable in the radial direction. The axial gap machine includes one or more stators, containing windings that conduct electrical currents, and one or more rotors, with sets of permanent magnets rotating on a shaft adjacent the stators. The magnets are supported by bearings in a magnet carrier on the rotor so that the magnets can move radially under the action of centrifugal force opposed by springs. The radial movement of the magnets reduces the number of lines of flux of the magnets that can interact with those created by the electrical currents flowing in the windings. Reducing the flux interaction allows an increase in the speed capability of the machine. Linear radial guides inside the magnet carrier restrict movement of the magnets in all directions other than the radial direction and stops limit outward and inward movement.

18 Claims, 5 Drawing Sheets

AXIAL GAP MOTOR WITH RADIALLY MOVABLE MAGNETS TO INCREASE SPEED CAPABLITY

BACKGROUND OF THE INVENTION

1. Field of the Invention

A permanent magnet electric machine of the axial air gap type that can adjust the axial gap field strength to increase the speed of the machine without increasing power by radially shifting the magnets under the influence of centrifugal force acting against spring resistance.

2. Description of Related Art

Back-emf in the machine is directly proportional to the gap flux density, the length of the conductors and the speed of rotation. As the speed increases, the back-emf continuously rises. At a certain speed, the back-emf will equal the applied voltage. This specific speed is called base speed. The motor cannot be rotated beyond the base speed because the back-emf exceeds applied voltage (which is assumed to be fixed and unalterable). In other words, if there is no mechanism to reduce back-emf, the base speed defines a theoretical limit beyond which the motor cannot rotate.

A conventional permanent magnet motor can provide high torques up to base speed, but cannot usually operate beyond it. Achieving maximum speeds that are a factor of three or five times higher than the base speed is difficult and has presented serious technological problems. Several methods have been developed to operate a permanent magnet motor beyond the base speed. These methods can be broadly grouped into electrical means, mechanical means and centrifugal means. The electrical means manipulate voltage or currents applied to the coils, the mechanical means employ a stator adjusted by an external actuator, while the centrifugal means employ movable rotor magnets that are moved by centrifugal action to alter the gap flux.

Several electrical means of enhancing the speed of permanent magnet machines have been devised. These include increasing the number of phases, deactivating some phase coils as speed increases, shaping the current, weakening the gap flux, boosting the applied voltage, changing the phase between the two, or switching from a wye-mode to a delta mode. U.S. Pat. No. 5,677,605 issued Oct. 14, 1997 to Cambier et al and U.S. Pat. No. 5,739,664 issued Apr. 14, 1998 to Deng et al and U.S. Pat. No. 4,546,293 issued Oct. 8, 1985 to Peterson et al, illustrate some of these approaches. The flux weakening technique uses large currents to suppress the field generated by the permanent magnet, thereby reducing the gap field. Large currents, however, increase temperature and potentially damage the magnets. This technique is applied mostly to sine-wave driven motors where mutual inductance between two phase coils is relatively large and non-negligible. It cannot be readily applied to square-wave driven systems, especially when the mutual inductance between the phase windings is negligible, even though attempts have been made to use it for surface-permanent-magnet machines. The voltage boost technique requires additional dc—dc converters to enhance the voltage applied to the motor windings. This, however, increases the cost of the motor drive and increases its weight while its efficiency of operation is reduced.

Mechanical means of enhancing the speed employ a movable stator to bring it closer to rotor magnets, thereby reducing or increasing the axial air gap. U.S. Pat. No. 2,719,331 issued Oct. 4, 1955 to E. Harris and U.S. Pat. No. 2,784,332 issued Mar. 5, 1957 to W. Kober, and U.S. Pat. No. 2,824,275 issued Feb. 18, 1958 to W. Kober, and U.S. Pat. No. 2,892,144 issued Jun. 23, 1959 to W. Kober, disclose means for flexibly mounting the stator such that the axial air gap can be increased or decreased as the load changes. U.S. Pat. No. 3,250,976 issued May 10, 1966 to E. McEntire and U.S. Pat. No. 5,627,419 issued May 6, 1997 to R. Miller, describe a radial gap machine in which the stator can be moved axially. Such methods require complex external energy sources with the overall efficiency of the motors reduced by the energy consumed by these actuating devices.

Centrifugal means to enhance motor speed do not require external devices or energy sources and hence they are self-actuating. They are preferable since they do not reduce the overall efficiency of the machines. The principal used is that rotary permanent magnets tend to fly radially outward under the action of centrifugal force. They have been proposed only for radial gap machines. U.S. Pat. No. 1,153,076 issued Sep 7, 1915 to J. Heinze discloses a hinged magnet and lever mechanism to move the rotating magnets radially outward thereby opening or increasing the radial air gap. U.S. Pat. No. 5,053,659 issued Oct. 1, 1991 to D. Parker also discloses a device for moving permanent magnets using centrifugal force.

These prior art centrifugal devices that are applied to radial gap machines suffer from several problems, namely opposing attraction forces, frictional losses and excessive flux leakage. The opposing attraction force problem stems from the fact that the centrifugal force must be large enough to overcome large attraction forces that exist between the rotor magnets and the stator in radial gap motors. As a result, a very small portion of the centrifugal force is available to increase motor speed. In addition, in radial gap motors the act of moving the magnets introduces significant flux leakage reducing the effectiveness of the magnets.

SUMMARY OF THE INVENTION

Many applications require a motor that can operate significantly beyond the base speed. A typical need is to have a motor that can use a constant power mode while operating beyond the base speed. While operating at low speeds, a constant torque mode is desirable, while at high speeds, a constant power mode is desired. An example of this is hybrid-electric vehicles that need a motor that can provide high torque at low speeds, up to base speed, such as while climbing hilly terrain in a constant torque mode, and providing smaller torque at speeds beyond the base speed, such as cruising on level roads in a constant power mode where the highest possible or maximum speed is called for. The present invention allows the same motor to deliver usable torque at speeds significantly higher than the base speed without increasing the power rating. The highest speed at which a motor can deliver usable torque is called the maximum speed. The ratio of maximum speed to base speed is called the speed ratio. This invention addresses the issue of providing a high speed ratio.

The invention discloses a centrifugal means for enhancing the speed of a permanent magnet motor. An axial gap permanent magnet motor with constant power mode capability moves the magnets move radially outward when the speed increases beyond the base speed.

The present invention provides a brushless dc permanent magnet motor including a stator, that can have two or more phase windings, and one or two rotors disposed adjacent to the stator and coupled through magnetic fields. One or both of the rotors have a set of alternately poled magnets that are mounted on anti-friction bearings with a means to radially move the permanent magnets relative to the soft iron rotor. The rotor magnets are prevented from moving in any direction other than the radial direction. As the magnets move radially out, the length of the conductor that links with the permanent magnet field is reduced. This in turn reduces the back-emf generated by the motor. As a result, the difference between the applied voltage and this smaller back-emf results in an increased current. This increased current in turn creates more torque and enables the motor to rotate beyond the base speed. The active length of coil conductor is defined as the portion of the conductor that is within the air gap field of the permanent magnets. The active length of the coil conductors is reduced (by removing a portion of the lines of force created by the magnets and cut by the active coil conductors by movement of the permanent magnet) to reduce back-emf thereby facilitating the constant power mode and increasing the maximum speed capability of the motor.

By reducing the active length of conductors, it is possible to increase the maximum speed of the motor significantly. This invention offers higher speed ratios than those of the known prior art designs. The pre-loaded spring within the motor resists the centrifugal force avoiding the need to use a strong wrap over the magnets. No external power is used or needed to facilitate the constant power mode. The need for complex field weakening or voltage boosting algorithms is avoided. By avoiding large currents to weaken the magnet's field, there is no danger of permanent damage to the magnets. By mounting the magnets on antifriction bearings, the magnets can move freely along the radial direction, yielding smooth operation and enhancing speed capability. By constructing the magnet support assembly such that there is very little flux leakage, the magnet's flux is fully utilized in enhancing speed.

DESCRIPTION OF THE PREFERRED EMBODIMENTS

Figure 1:
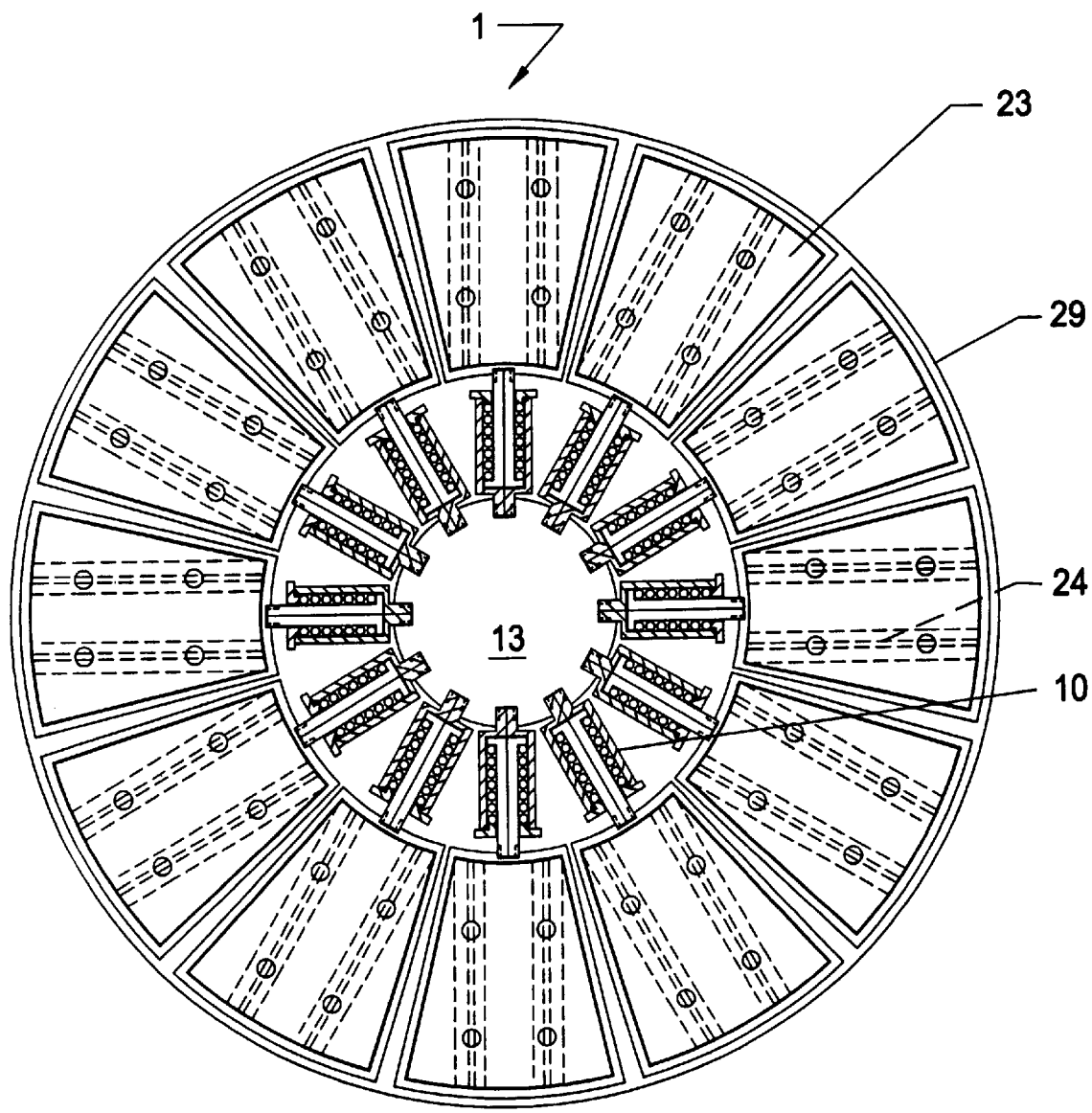
FIG. 1 is a schematic end view of a sliding magnet motor rotor of the invention.

The basic concept of the invention is to have the magnets move radially outwardly at increased motor speeds. Any convenient bonding and physical arrangement that permits movement of the magnet unit without frictional resistance or field interference can be used. FIG. 1 shows the radially movable magnet rotor mechanism 1. Its primary function is to enable the magnet slide units 24 to slide radially outwardly acting against spring resistance provided by springs within the spring modules 10 as the speed increases due to centrifugal force on the rotor modules 23. The rotor consists of a plurality of moving magnet modules 23 arranged around the soft-iron rotor 29. The soft-iron rotor 29 itself is attached to the shaft 13. The magnets, supported on the magnet support module 23, are located on or beside or inside the soft-iron rotor 29. Stops are provided to limit radial movement of the magnets.

Figure 2:
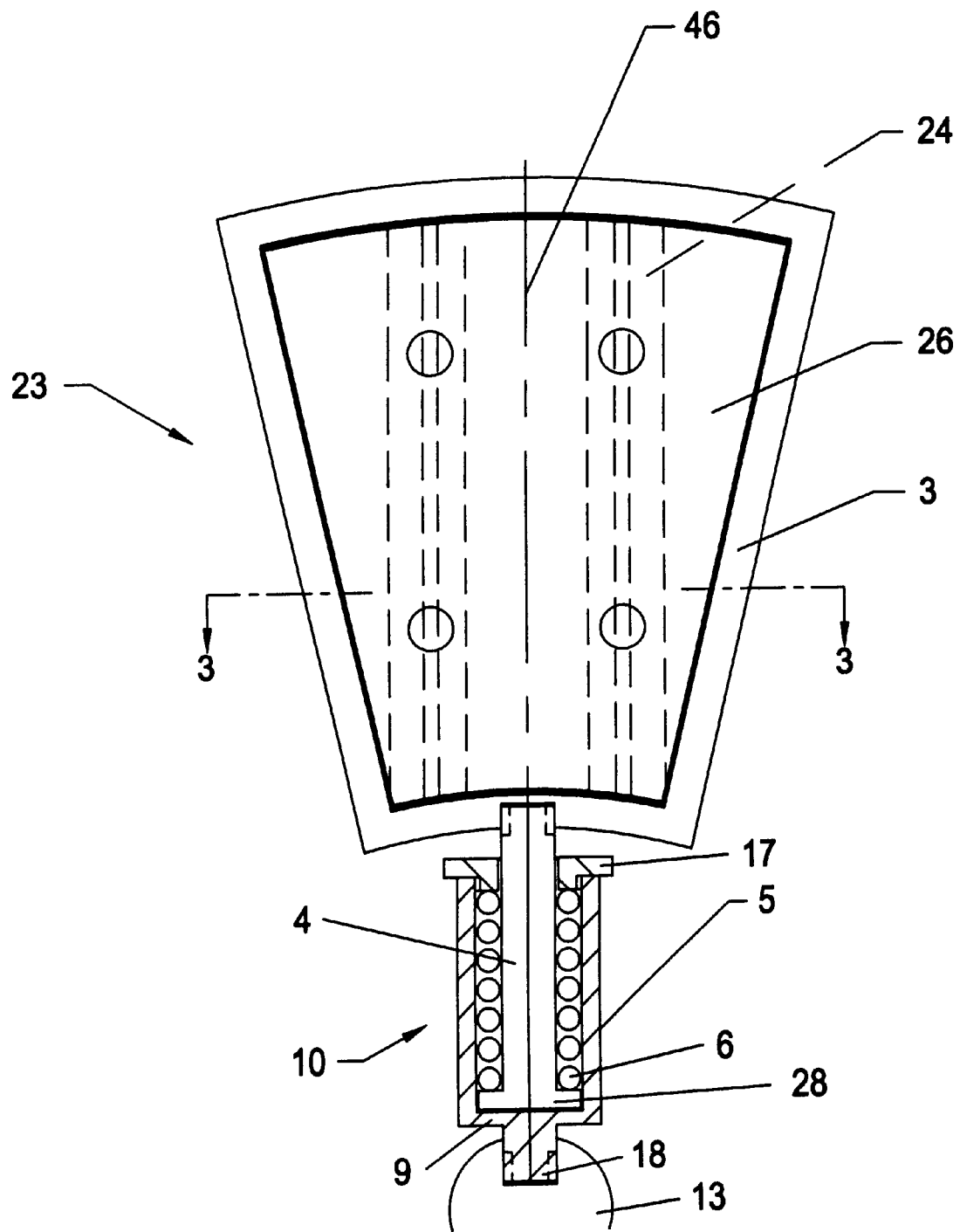
FIG. 2 is a plan end view of magnet support module and accompanying spring module.

While various schemes can be devised to permit magnet movement, springs are preferred because of their simplicity and reliability. FIG. 2 shows a preferred spring module 10. Its primary function is to resist the centrifugal force generated by the magnet slide units as the shaft 13 rotates. It includes a spring cylinder 5, having a root 18 that is attached to the shaft 13, a spring 6 within the cylinder 5, a stem 4 that has one first end attached to the frame 3 of the magnet support module 23 and a second end provided with a protrusion or flange 28 that seats against one first end of the spring 6, and that can be used as a stop. A pre-load nut 17 seats the other second end of the spring 6 and can be used to adjust the pressure the spring exerts against the stem 4 as a resistance force against centrifugal force created during rotation of the sliding magnet 26 and its soft-iron slide support 7 during shaft 13 rotation.

Figure 4:
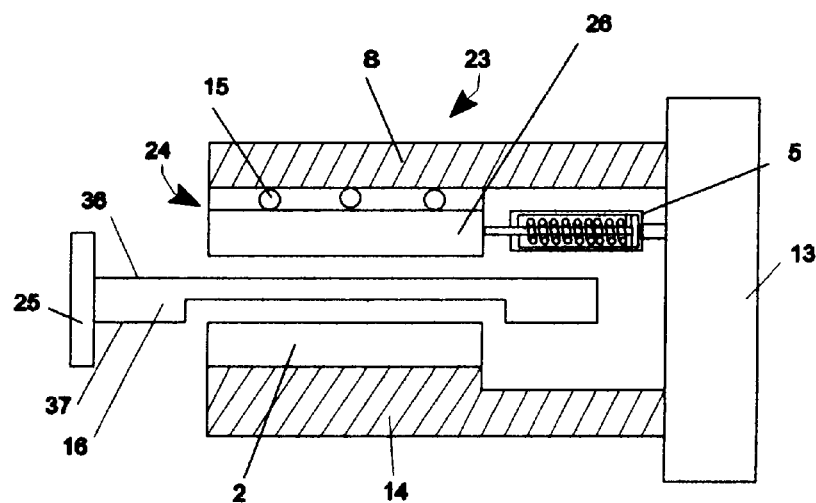
FIG. 4 is a cross-sectional view of a second embodiment of the invention.
Figure 5:
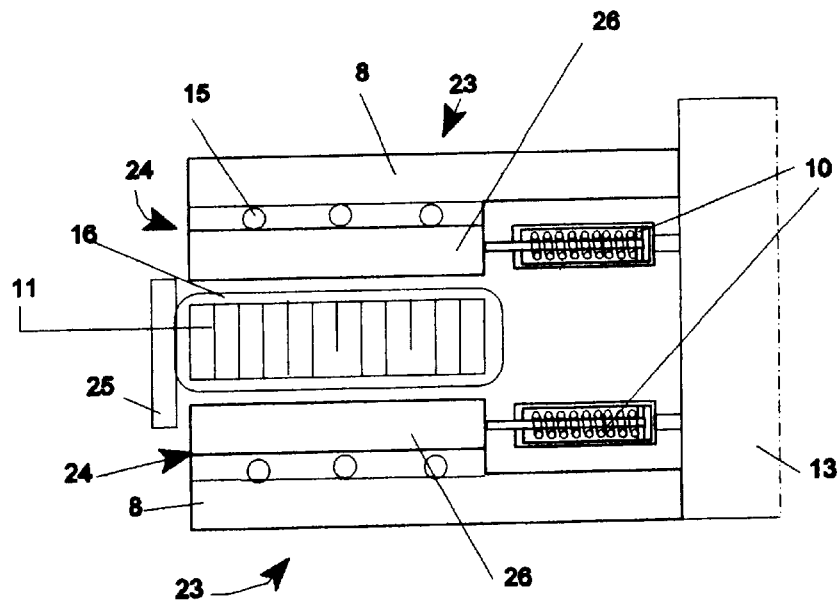
FIG. 5 is a cross-sectional view of a third embodiment of the invention.
Figure 6:
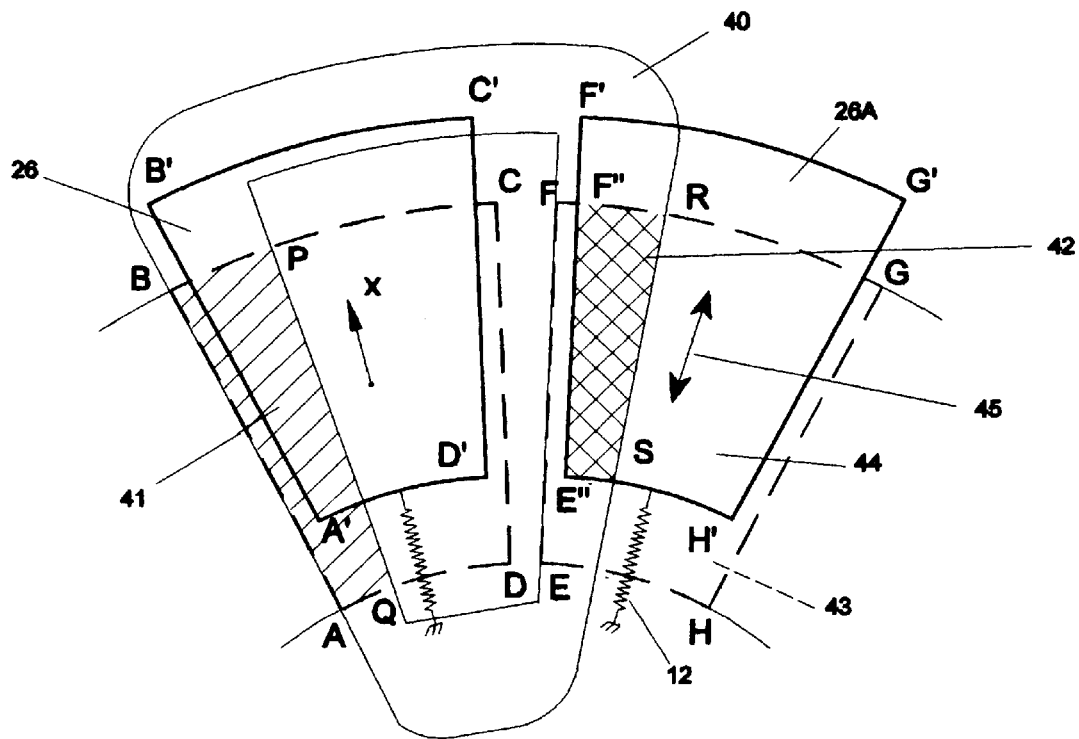
FIG. 6 illustrates the active flux area of the motor of the invention as the magnets move radially.

The spring can be a tension spring 12, as shown in FIG. 6, or a compression spring, as shown in FIGS. 1, 2, 4 and 5. The primary function of the spring cylinder 5 is to house the spring that resists and opposes centrifugal loads. The spring cylinder has a root 18 on its first or lower end for attaching it to the shaft 13 and a threaded upper second end for receiving a pre-load nut 17. The first end inner extreme of the cylinder functions as a stop 9 to constrain inner movement of the spring 6. Since centrifugal force increases exponentially with the speed of rotation, a spring whose stiffness or resistance to change in length should also be exponential. Such non-linear springs can be easily designed and a simple helical spring can be used. Where large strokes beyond the capacity of helical springs are desired, a lever mechanism that matches the stroke and force may be used. The pre-load nut 17 functions to adjust the initial pre-load pressure of the spring 6 so that the magnet slide unit 24 will not move radially as long as the shaft rotates below the base speed. The pre-load nut 17 consists of a threaded portion with a flat face that screws into the cylinder 5 and has a central opening extending through the nut for accommodating the stem 4. The total length of the thread is designed to extend far enough to cause pre-load pressures that will be encountered at the base speed. The expected pre-loads are the sum of the centrifugal force created at the base speed, including all of the components attached to the stem, and shear or frictional forces encountered. The spring material is chosen so that it can withstand the forces created at maximum shaft speed including the ability to withstand severe vibratory loads. The primary function of the stem 4 is to transfer centrifugal force from the frame 3 to the spring. It can be made of high strength alloy steel that can resist these forces while offering low friction within the cylinder 5 and pre-load nut 17. The stem can be threaded at one first end so that it can be screwed into the frame 3 while the second end has a flange 28 that seats the spring 6 first end and can act as a stop when the spring is fully compressed.

Figure 3:
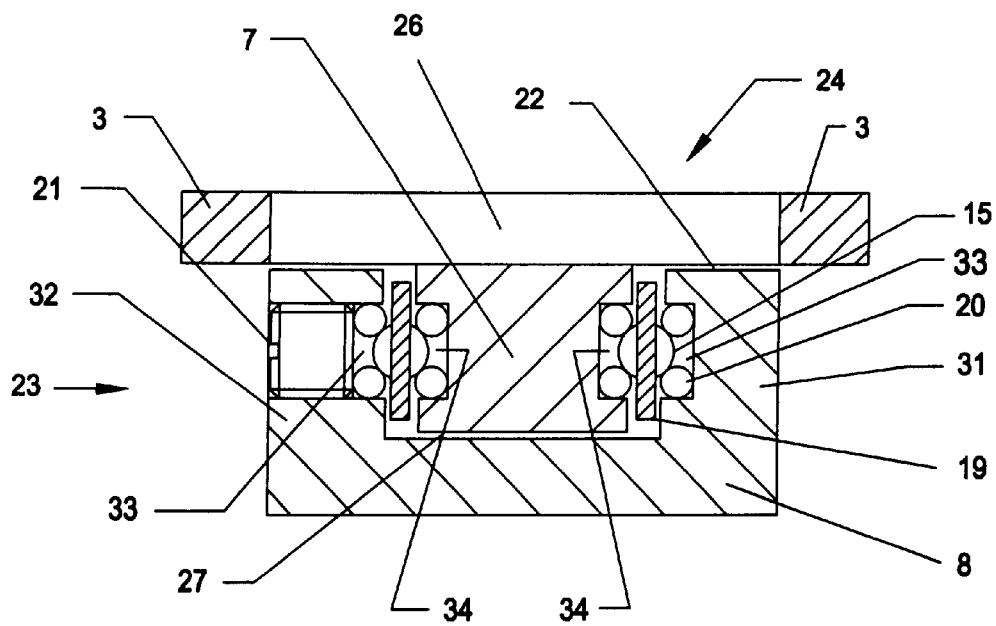
FIG. 3 is a cross-sectional view taken along the line 3—3 of FIG. 2.

FIG. 3 is a cross-sectional view of the magnet support module 23 taken along the line 3—3 of FIG. 2. The magnet support module 23 includes a magnet slide unit 24. Its primary function is to position and control magnet movement in the radial direction while preventing movement in all other directions. The magnet slide unit 24 basically comprises a sliding magnet 26 that is mounted on a soft-iron slide 7. The magnet slide unit operates in concert with the magnet support module base 8. The base 8 is preferably a soft-iron material having a radial channel 27 that forms two legs 31,32. The soft iron base 8 is attached to the rotor 29 or is a part of the rotor. The soft-iron slide 7 is attached to the stem 4 directly or by means of a frame 3 and is guided within the channel 27 by the radial slide mechanism. The radial slide mechanism preferred includes cylindrical steel rails 20, sliding ball bearings 15 and retaining cage 19. The steel rails are precision ground and polished to reduce friction and are of a size sufficient to transfer the encountered loads without significant wear. Grooves 33 are formed in both legs 31,32 of the soft-iron base and grooves 34 are formed on both side edges of the soft-iron slide 7. The grooves are preferably precision cut. The radial slide mechanism steel rails 20 are positioned within the grooves 33,34 of the soft-iron slide 7 and the soft-iron base 8. They trap steel balls 15. The grooves are parallel to the central radial line 46 of the magnets. The balls 15 are separated by metallic cages 19 that ensure that they do not stick when moved by centrifugal force. The balls roll over the steel rails and make only point contact, thus reducing friction. When the motor rotates above base speed, it exerts a centrifugal force that is sufficient to cause the magnet to move outward against the spring pressure with the balls rolling over the steel rails. The balls transmit forces to the base but prevent motion of the magnet in all directions other than the radial.

A pressure device is provided in one leg 32 of the base 8, shown as an adjustable screw 21. The soft-iron base radial channel 27 houses the radial sliding unit soft-iron slide 7. The pressure between the steel rails and the balls can be adjusted so that the friction between the components controls the resistance to relative movement between the magnet support module 23 and the magnet slide unit 24.

The design of the support module determines the minimum centrifugal force that has to be resisted, the maximum centrifugal force that is to be transmitted by the spring and the maximum travel that is allowed under this force. The former two quantities will be calculated from the magnetic flux circuit and torque-speed curve respectively. Using geometry, the maximum travel will be calculated from the speed ratio and the ratio of the outer and inner radii of the magnetic slide unit in its relationship to the phase coil.

The unit is shaped and positioned so that a small magnetic air gap 22 exists between the sliding magnet unit and non-sliding soft-iron base 8. The air gap is made small so that most of the magnetic field produced by the permanent magnets gets concentrated in the air gap between the stator and rotor. The flat interface of the soft-iron base legs is precision ground so that the air gap 22 is only a few mils and preferably less than 5 mils wide to reduce flux leakage. The magnet 26 can be mounted on soft-iron slide 7 by using epoxy, composite wrap or a combination of the two or other means as long as the bond is strong enough to withstand the attraction forces and inertia at elevated temperatures. The soft-iron slide 7 has precision grooves cut along the two edges that house the steel rails 20. Any convenient bonding and physical arrangement that permits movement of the magnet unit without undue resistance or field interference can be used.

The primary function of the magnetic frame 3 is to transfer the centrifugal loads from the magnet 26 to the spring 6 through the stem 4. Each magnet frame 3 encloses one permanent magnet block 26 which itself is mounted on a magnet slide unit 24. The frame 3, magnet block 26, and soft-iron slide 7 form a moving assembly that slides over steel rails 20. The fame 3 is made of high-strength non-magnetic material; its diameter will be calculated from the centrifugal load and yield stress. The frame 3 surrounds the magnet and contains the stem 4 at one end.

FIG. 4 shows a second embodiment of the proposed axial gap motor. In this embodiment the motor has two rotor disks 8,14 on rotor shaft 13 that sandwich a stator 16 that has phase-coil windings extending from a housing 25. The windings have one side 36 that is flat and another side 37 that contains thicker end windings. The flat side 36 of the stator faces the movable magnet slide unit 24 of the invention. The end winding side of the stator 37 faces a soft-iron rotor 14 that may contain radially immobile magnet blocks 2 or, alternatively, only iron poles. Magnet support module 23 has a magnet slide unit 24 that contains the sliding magnet 26 on sliding bearings 15 that move radially under the action of centrifugal force acting against spring resistance within the spring module 10. The soft-iron base 8 and rotating disk 14 facilitate closing the magnetic field circuit generated by the permanent magnets.

FIG. 5 shows a third embodiment. The motor in this embodiment has two magnet support modules 23 and magnet slide units 24 sandwiching a stator with toroidal windings. This stator contains toroidal laminations 11 over which a conductor 16 is wrapped. These are supported by a housing 25. Both of the magnet support modules 23 contain radially movable magnets 26 that act against springs in spring modules 10. The magnet slide units 24 move radially on bearings 15 over soft-iron bases 8 that are attached to shaft 13.

In all three embodiments, as the speed increases beyond the base-speed, the magnets-blocks slide outward radially due to centrifugal force. As they slide, the length of the active conductor that interacts with the magnetic field is reduced. This in turn reduces the back-emf generated. The reduced back-emf allows the motor to rotate at higher speeds without exceeding the applied voltage.

FIG. 6 depicts the operating principles. Two magnets 26 and 26A of opposite polarity are shown overlapping a single phase coil 40. The moving magnet assembly operates against a preloaded spring 12. As the speed increases, the tension spring expands under the centrifugal force created by the rotation of the magnet. This allows a change in the radial position of the permanent magnets as the speed increases.

When the motor is at rest, the two neighboring magnets are in their normal at rest location ABCD and EFGH or initial position 43. A phase coil ABRS overlays the magnets. The "active conductor", i.e., the portion of conductors that interacts with the permanent magnet occupies the shaded area ABPQ or initial active conductor area 41. Currents in these conductors interact with the magnetic field to create a relatively large torque. The torque is directly proportional to this active conductor area.

As the motor starts rotating, all the magnets on the magnet support modules try to slide outward under centrifugal force. This centrifugal force is resisted by the initial pre-load on the spring 12. As long as the centrifugal force generated by the magnet is smaller than the initial pre-load, the magnets will not move from their initial position. As a result, the torque produced by the magnetic field will continue to be proportional to the initial active conductor area ABPQ. Under this condition the motor is said to be operating in the constant torque mode. This condition routinely continues until the base speed of the motor is reached.

At the base speed, the back-emf will essentially equal the applied voltage. The centrifugal load on the magnets essentially equals the pre-load on the springs. At speeds above the base speed, the spring pre-load force is exceeded by centrifugal force and the magnets start to move away from their initial at rest position 43.

The difference between the centrifugal force and the pre-load will determine the extent of radial movement. The magnet block ABCD moves along the radial line 45 to A'B'C'D' and the magnet block EFGH moves to E'F'G'H' or new magnet position 44. Because of this displacement, the active conductor area will be reduced. For the sake of clarity, this smaller conductor area is shown as E"F"RS, on the right side of the phase coil, or reduced active conductor area 42. This reduction in the active conductor area reduces the back-emf below the applied voltage. This difference between the applied voltage and back-emf creates an increase in current flow that tends to produces more torque. This tendency to produce additional torque increases the motor speed if the motor load resistance can be reduced. Thus speed can be increased until the maximum speed is reached.

Figure 7:
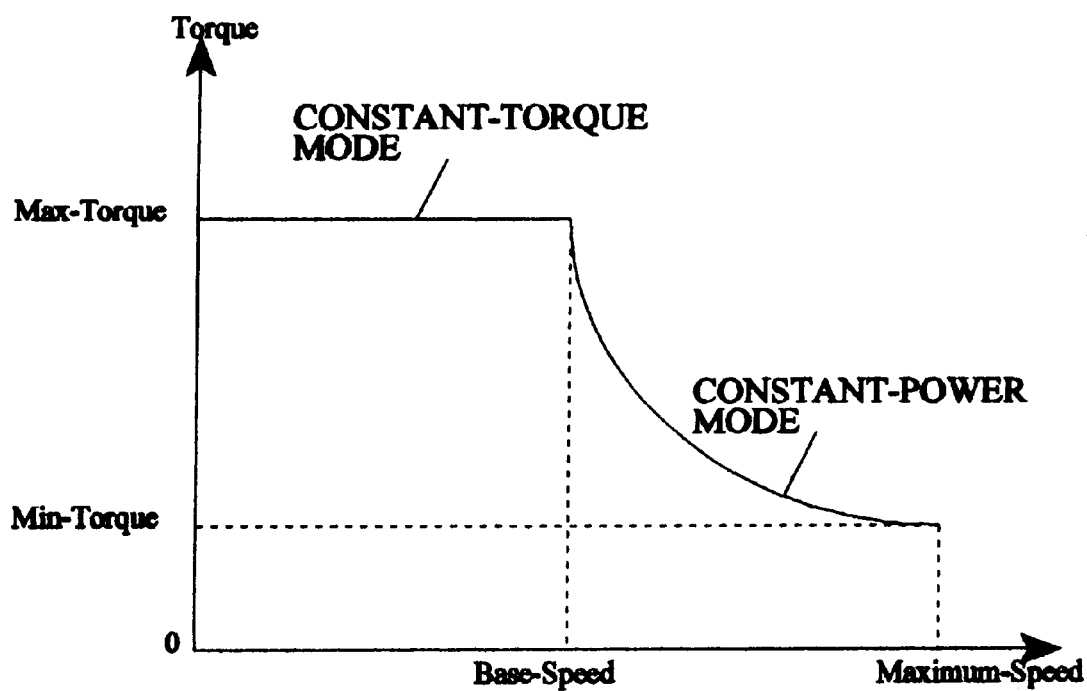
FIG. 7 shows a speed-torque curve for a typical air gap motor of the invention.

FIG. 7 is a torque-speed curve for an axial gap motor. The minimum and maximum motor torque for a given motor are plotted against motor speed. Below the motor base speed a constant torque mode is shown. Above the base speed, and up to the motor maximum speed, a constant power mode is shown. In this latter mode, as the torque is lowered current increases resulting in a speed increase. The constant power mode is the motor speed area addressed by this invention.

As seen in FIG. 6, the spring 12, extended to its maximum allowable position, has an active conductor area just sufficient to produce the minimum torque necessary for a given load. At the same time the back-emf is at the smallest. This reduction of back-emf and torque can be continued until a maximum speed is reached.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

What is claimed is:

1. An axial gap motor including:

a radially extending stator supporting a radially extending electric conducting coil;

a shaft extending essentially perpendicular to said radially extending stator and said radially extending electric conducting coil;

a radially extending rotor, fixed to said shaft and rotatable therewith, adjacent to said radially extending stator and said radially extending electric conducting coil supported by said stator;

magnet support means on said radially extending rotor movable radially inwardly and radially outwardly adjacent to said radially extending electric conducting coil;

magnets held by said magnet support means such that a magnetic flux of said magnets can interact with a magnetic flux of said electric conducting coils to vary back emf generated within said electric conducting coil as said magnet support means moves radially inwardly and radially outwardly;

said magnets at a radial inward at rest position are located adjacent to said radially extending electric conducting coil such that said flux of said magnets essentially overlaps said flux of said radially extending electric conducting coil;

said magnets moved radially outward from said radial inward at rest position, results in only a partial radial overlap of said flux of said magnets and said flux of said radially extending electric conducting coil.

2. An axial gap motor as described in claim 1 wherein:

said magnet support means includes a radial guide for permitting said radial inward and said radial outward movement between said magnets and said electric conducting coil.

3. An axial gap motor as described in claim 2 wherein:

a spring opposes outward radial movement of said magnets against a centrifugal force.

4. An axial gap motor as described in claim 3 wherein:

a pre-load means is provided for placing an initial force on said spring.

5. An axial gap motor as described in claim 3 wherein:

a spring cylinder is included with said magnet support means;

said spring is a compression spring having a first end and a second end secured within said spring cylinder;

a stem having a first end and a second end extends between said magnet support means and said spring to transport said centrifugal force from said magnet support means to said compression spring and spring pressure from said compression spring to said magnet support means.

6. An axial gap motor as described in claim 5 wherein:

said magnet support means includes a radial guide;

said stem first end is attached to said magnet support means;

said stem second end is provided with a flange that supports said compression spring first end.

7. An axial gap motor as described in claim 6 wherein:

said compression spring second end is secured within said spring cylinder by a pre-load nut that can adjust an initial pressure onto said compression spring against said stem second end flange.

8. An axial gap motor as described in claim 6 wherein:

said stem extends through said compression spring;

said spring cylinder first end includes a root for securing said spring cylinder to said shaft;

said spring cylinder second end includes threads for securing said pre-load nut to a spring cylinder second end.

9. An axial gap motor as described in claim 1 wherein:

said magnet support means includes a base and a magnet slide unit;

said magnet slide unit is attached to said base such that said magnet slide unit can move radially outward and radially inward on said base member in response to centrifugal and spring-created forces.

10. An axial gap motor as described in claim 9 wherein:

said magnet slide unit includes a slide with said magnets attached to said slide;

said base includes first and second legs forming a radial channel between said legs;

said magnet slide unit slide extends into said base radial channel to limit said magnet slide unit movement to the radial direction.

11. An axial gap motor as described in claim 10 wherein:

said magnet slide unit slide ha s grooves formed in both edges of said slide;

said base first and second legs have grooves formed in them;

bearing means are positioned within said magnet slide unit grooves and said base first and second leg grooves to reduce friction between said magnet slide unit and said base.

12. An axial gap motor as described in claim 11 wherein said bearing means are ball bearings;

rails means and cage means are placed within said base leg grooves and said magnet slide unit grooves to confine said ball bearing and to limit contact between said ball bearings and said base and said magnet slide unit;

a pressure means is provided on said base for controlling the pressure exerted between said magnet slide unit, said base and said bearing means.

13. An axial gap motor as described in claim 10 wherein:

said support means for permitting relative movement between said magnets and said electric conducting coil is on one first side of said electric conductor coil while fixed magnets are on a second rotor on the second side of said electric conducting coil.

14. An axial gap motor as described in claim 9 wherein:

said base leg ends and said magnet slide unit are precisely manufactured so that a narrow air gap extends between them that is less than 5 mils wide.

15. An axial gap motor as described in claim 1 including:

magnets on a second rotor;

said magnets being positioned on either side of said electric conducting coil.

16. A process for increasing speed of axial gap motors including:

placing a stator having electric conducting coils in a housing around a shaft;

placing a rotor having permanent magnets adjacent said electric conducting coil;

supporting said permanent magnets on a radially movable support;

positioning said permanent magnets at rest adjacent to said electric conducting coil so that a magnetic flux of said magnets and a magnetic flux of said electric conducting coil overlap each other radially;

reducing back emf and said permanent magnets flux and said electric conducting coil flux overlap by moving said magnets radially outwardly from said shaft as speed of rotation of said shaft increases.

17. A process for increasing speed of axial gap motors as described in claim 16 including:

controlling said magnets' radial outward movement by interfacing a centrifugal force against a spring force.

18. A process for increasing the speed of axial gap motors as described in claim 17 including:

controlling the radial movement of said magnets by pre-loading said spring with a predetermined force necessary to be overcome before said magnets can move radially outward.

* * * * *